United States Patent [19]

McIntyre

[11] Patent Number: 5,628,034
[45] Date of Patent: May 6, 1997

[54] IMAGE RECORDING APPARATUS WITH MOVEMENT DETECTOR AND LASER EMITTER

[75] Inventor: Dale F. McIntyre, Honeoye Falls, N.Y.

[73] Assignee: Eastman Kodak Company, Rochester, N.Y.

[21] Appl. No.: 606,717

[22] Filed: Feb. 27, 1996

Related U.S. Application Data

[60] Provisional application No. 60/002,340 Aug. 15, 1995.
[51] Int. Cl.$^6$ .................... G03B 5/00; G03B 7/08; G03B 13/18
[52] U.S. Cl. ..................... 396/52; 396/106; 396/431
[58] Field of Search .................. 354/165, 70, 202, 354/400, 430, 403, 410; 348/208, 169; 359/554; 396/52, 53, 55, 106, 108, 431

[56] References Cited

U.S. PATENT DOCUMENTS

| | | | |
|---|---|---|---|
| 3,690,234 | 9/1972 | Costianes | 396/153 |
| 4,448,510 | 5/1984 | Murakoshi | 354/289.12 |
| 4,901,096 | 2/1990 | Lemelson | 354/268 |
| 5,059,019 | 10/1991 | McCullough | 352/131 |
| 5,150,150 | 9/1992 | Enomoto | 354/456 |
| 5,189,463 | 2/1993 | Capper et al. | 354/403 |
| 5,220,375 | 6/1993 | Ishida et al. | 354/430 |
| 5,266,981 | 11/1993 | Hamada et al. | 354/400 |
| 5,365,303 | 11/1994 | Yamasaki et al. | 354/430 |
| 5,365,304 | 11/1994 | Hamada et al. | 354/430 |
| 5,386,264 | 1/1995 | Sekine et al. | 354/430 |
| 5,485,235 | 1/1996 | Meyers | 354/165 |
| 5,543,889 | 8/1996 | McIntrye | 354/165 |
| 5,546,156 | 8/1996 | McIntrye | 354/165 |

FOREIGN PATENT DOCUMENTS

| | | | |
|---|---|---|---|
| 2252836A | 8/1992 | United Kingdom | G03B 15/035 |
| WO93/13452 | 7/1993 | WIPO | G03B 13/02 |

*Primary Examiner*—A. A. Mathews
*Attorney, Agent, or Firm*—David A. Howley; Charles E. Snee, III

[57] ABSTRACT

An image recording apparatus (e.g. camera) includes a laser emitter which emits a beam of laser radiation towards a scene to be recorded. A movement detector detects when the image recording apparatus is being moved at or above a predetermined magnitude such that blurred images may be recorded. A controller controls an output level of laser radiation from the laser emitter. The controller enables the laser emitter to emit laser radiation when the movement detector detects movement of the image recording apparatus at or above the predetermined magnitude and disables the laser emitter from emitting laser radiation when the movement detector detects movement of the image recording apparatus below the predetermined magnitude.

7 Claims, 3 Drawing Sheets

IMAGE RECORDING APPARATUS WITH MOVEMENT DETECTOR AND LASER EMITTER

CROSS-REFERENCE TO RELATED APPLICATIONS

Reference is made to and priority claimed from U.S. Provisional Application Ser. No. US 60/002,340, filed 15 Aug. 1995, entitled IMAGE RECORDING APPARATUS WITH MOVEMENT DETECTOR AND LASER EMITTER.

Reference is made to commonly assigned copending applications Ser. No. 08/245,993, filed in the name of Meyers on May 19, 1994, now U.S. Pat. No. 5,485,235, and Ser. No. 08/242,891, filed in the name of McIntyre on May 16, 1994, now U.S. Pat. No. 5,543,889, each of which are assigned to the assignee of this application.

FIELD OF THE INVENTION

The invention relates generally to the field of imaging, and in particular to image recording apparatus. More specifically, the invention relates to an image recording apparatus having a movement detector and a laser emitter.

BACKGROUND OF THE INVENTION

As the cost of visible laser diodes drops, their value as a pointing aid will increasingly find new applications in need of the assistance they provide to an apparatus that needs to be visibly aimed. Most notably today, visible lasers are used to aim weapons of all types including personal small arms. Shooters strive to align the visible laser beam with the impact of the projectile at a given range. Such is the effect when aiming a camera and shooting pictures.

Known in the art are cameras that call for the use of a visible laser to assist the photographer in aiming the camera without the need to look through a viewfinder. For example, British Patent No. 2 252 836 discloses a camera/flashlight/laser pointer apparatus used for aiming a camera while in pursuit of a suspicious person. A traditional viewfinder is not needed with this apparatus. In U.S. Pat. No. 5,189,463, a video camera is aimed with the assistance of a visible laser diode that is said to obviate the need for a user to look through a viewfinder.

These devices concentrate a lot of energy into a highly collimated radiation beam of small diameter, and thus can be hazardous to biological tissue if exposed for extended periods. As the visible laser diode has found its way into laser pointers and other consumer goods, the government has found it necessary to classify them by power levels and the potential level of damage where people are concerned. Such is the concern of the above cross-referenced Meyers patent application whereby a visible radiation beam used to aim a camera is broken into multiple discrete beams to avoid impinging all the energy on a human eye.

Laser power control schemes, such as those disclosed in the above cross-referenced McIntyre patent application, take necessary precautions to prevent the intentional or unintentional use of the laser to do damage to the human eye. One of these features is the timing of the overall period that the laser is allowed to be in the "on" mode regardless of the users interaction with the shutter button which triggers the laser. With low power laser diodes, the ability to damage the retina of the eye is a function of the overall power of the beam along with the cumulative effects as a function of time. A second feature is the imposition of an "off" period before the laser can be retriggered which addresses the ability of a reckless person to continue to aim the beam at a subject's eye.

However, the responsible camera user may find these safety measures too constraining. Therefore, it is incumbent upon the camera manufacturer to provide a design that minimizes the risk of tissue damage while maintaining the flexibility of the photographer to follow a moving object. For example, a situation where the safety measures are not necessary includes conditions where the camera is used to track a moving object such as a person running or a race car moving on a track. In these cases, the likelihood that a laser could impinge on the subjects eye for any length of time is extremely low.

Cameras that have this degree of sophistication often include sensing apparatus which warn the user when it detects undesirable camera motion for a given photographic situation. In U.S. Pat. No. 4,448,510 to Makoto, an accelerometer apparatus converts camera shake (movement) into an electrical signal that generates an alarm for notifying the photographer that the possibility of recording blurred images due to camera shake is high. Usually this takes the form of preventing an exposure where the shutter speed is less than 1/(focal length) or forcing the user to either use a lens of appropriately shorter focal length or driving a zoom lens to the equivalent focal length that would minimize the effects of camera shake. Such a camera is described by U.S. Pat. No. 5,365,304 to Hamada et al.

In U.S. Pat. No. 5,386,264 to Sekine et al., a shake detecting device is used to detect the shake of a video signal output from an image sensor and compensate for the movement if it is due to camera shake vs. subject motion. In either case, the detection of relative motion between the camera and the scene would make it virtually impossible to impinge laser light on the retina sufficient to damage biological tissue. Therefore in such conditions, the laser aiming aid should not be turned off in accordance with existing control schemes.

SUMMARY OF THE INVENTION

The present invention is directed to overcoming one or more of the problems set forth above. Briefly summarized, according to one aspect of the present invention, an image recording apparatus includes a laser emitter which emits a beam of laser radiation towards a scene to be recorded. A movement detector detects when the image recording apparatus is being moved at or above a predetermined magnitude such that blurred images may be recorded. A controller controls an output level of laser radiation from the laser emitter. The controller enables the laser emitter to emit laser radiation when the movement detector detects movement of the image recording apparatus at or above the predetermined magnitude and disables the laser emitter from emitting laser radiation when the movement detector detects movement of the image recording apparatus below the predetermined magnitude.

By enabling the laser emitter to emit laser radiation while the image recording apparatus is being moved at or above a predetermined magnitude, the laser radiation will be available for aiming and/or autofocus the entire time of movement. The laser emitter is disabled when movement of the image recording apparatus drops below the predetermined level, thereby preventing the laser radiation from possibly being maintained on a human eye-pupil, thereby damaging the eye.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
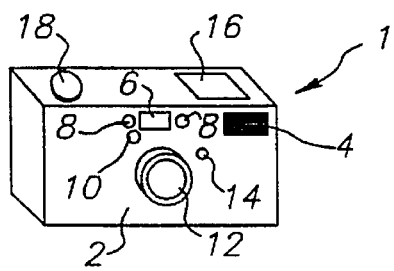
FIG. 1 is a schematic perspective view of a point and shoot camera in which the present invention is embodied.

Starting with FIG. 1, a camera 1 includes a camera body 2 and a flash 4 which provides supplemental illumination for poorly lit scenes. A viewfinder window 6 transmits an image of the scene towards a back surface of camera 11 where a camera operator can view the transmitted scene through a viewfinder in order to compose an image to be recorded. An active autofocus system 8, well known to those skilled in the art, includes an infrared radiation transmitter and receiver. The autofocus system measures one or more parameters of the infrared radiation reflected from the scene in order to determine the camera to scene distance. As such, a proper focus position for the camera's taking lens 12 can be determined and attained.

A visible laser pointer 10 includes a laser diode which emits visible laser radiation, and collimating optics which forms the laser radiation into a beam of visible light. Although this embodiment is described in terms of a visible laser, the present invention is applicable to a laser which emits non-visible (e.g. infrared) radiation for use in a laser active autofocus system). The timing for a laser used for autofocus and a laser used for aiming are identical as to when the laser is turned on. They both are initiated upon depression of shutter button 18 to a first stage and timed similarly. The exception is that the act of aiming the camera takes much longer than an autofocus acquisition. Aiming a camera may take several seconds where acquiring subject distance takes substantially less than a second, on the order of 100 mS.

Laser pointer 10 is substantially aligned with the optical axis of taking lens 12 to minimize parallax errors using techniques common in the non-SLR viewfinder art. An exposure cell 14 measures scene illumination to determine shutter speed, the correct exposure aperture and whether or not to use flash 14. A liquid crystal display 16 provides camera status and prompts to the camera user.

Camera 1 also includes a two-stage shutter button 18. When shutter button 18 is partially depressed to the first stage, the laser pointer is turned on to assist in pointing the camera at the intended subject. At this first stage of the shutter button, autofocus system 8 and exposure system 14 are acquiring their respective data. When shutter button 18 completes its travel to the second stage, an internal camera shutter trips, exposing the film (or image sensor if an electronic camera) to scene light. At this second stage of the shutter button 18, the visible laser is shut off, thereby preventing exposure of the visible aiming spot in the scene onto the film.

Figure 2:
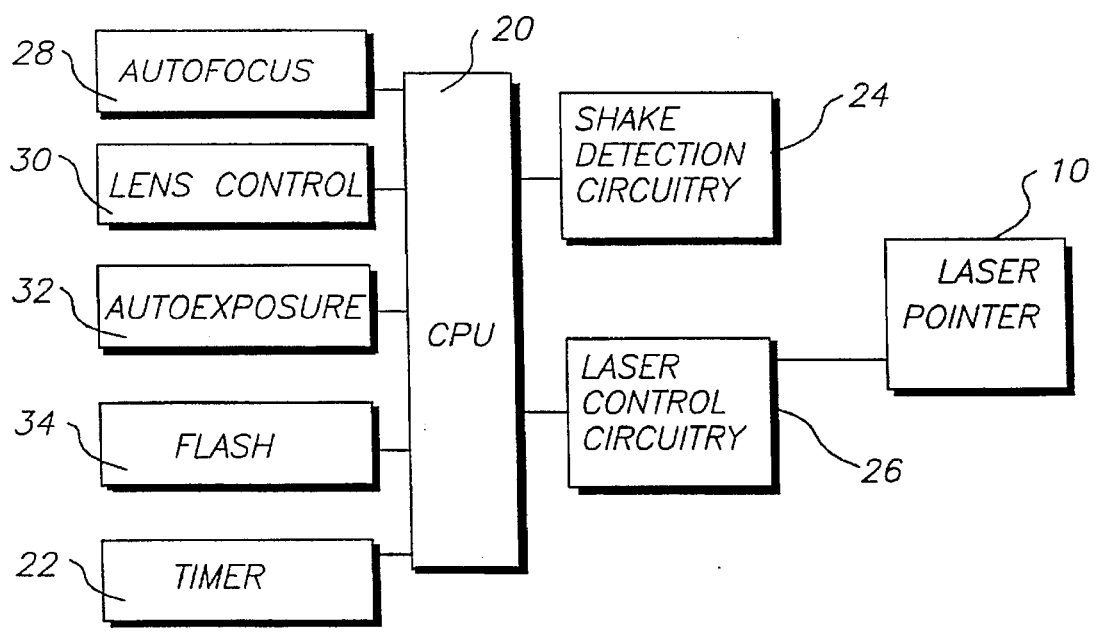
FIG. 2 is a block diagram displaying the components of the camera of FIG. 1.

Turning to FIG. 2, a microcontroller or central processing unit 20 (CPU) within camera body 2 controls operation of the camera. A timer 22 is utilized by the CPU to determine when to turn off laser pointer 10 (explained in further detail with reference to FIG. 3). Shake (movement) detection circuitry 24 informs CPU 20 when the camera is being moved (accelerated/decelerated) at or above a predetermined magnitude. Shake detection circuitry 24 can be the same circuitry as used to process the autofocus signal if the camera uses a passive, through-the-lens correlation type autofocus (as in FIG. 4). Certain shake detection schemes use the autofocus sensor 70 (FIG. 4) to measure image displacement vectors over short intervals of time. As such, the shake detection circuitry adds nothing additional in terms of hardware. Instead, a different software algorithm is used to determine if perceived movement was caused by the camera/photographer or was caused by subject movement in the scene. Other shake detection schemes use sensors independent of existing autofocus sensors. An example is the accelerometer used in U.S. Pat. No. 4,448,510 to Makato which is incorporated herein by reference.

Laser control circuitry 26 provides the electrical signal to the laser diode of laser pointer 10 in order to control the emission of laser radiation from the laser diode. An autofocus module 28 includes circuitry which controls emission of infrared radiation from autofocus system 8 and measures infrared radiation reflected back from the scene. CPU 20 utilizes the signal from the autofocus module to determine the camera-to-scene distance. Once camera-to-scene distance is determined, CPU 20 causes lens control mechanism to move taking lens system 12 to the appropriate focus position for the determined camera-to-scene distance.

An autoexposure module 34 includes exposure cell 14 which measures scene ambient light. Module 34 provides a signal to CPU 20 indicating the scene ambient light level such that CPU 20 can determine shutter speed, the correct exposure aperture and whether or not to use flash 14. Flash module 34 includes circuitry for providing electrical energy to flash 4 when supplemental scene illumination is required.

Figure 3:
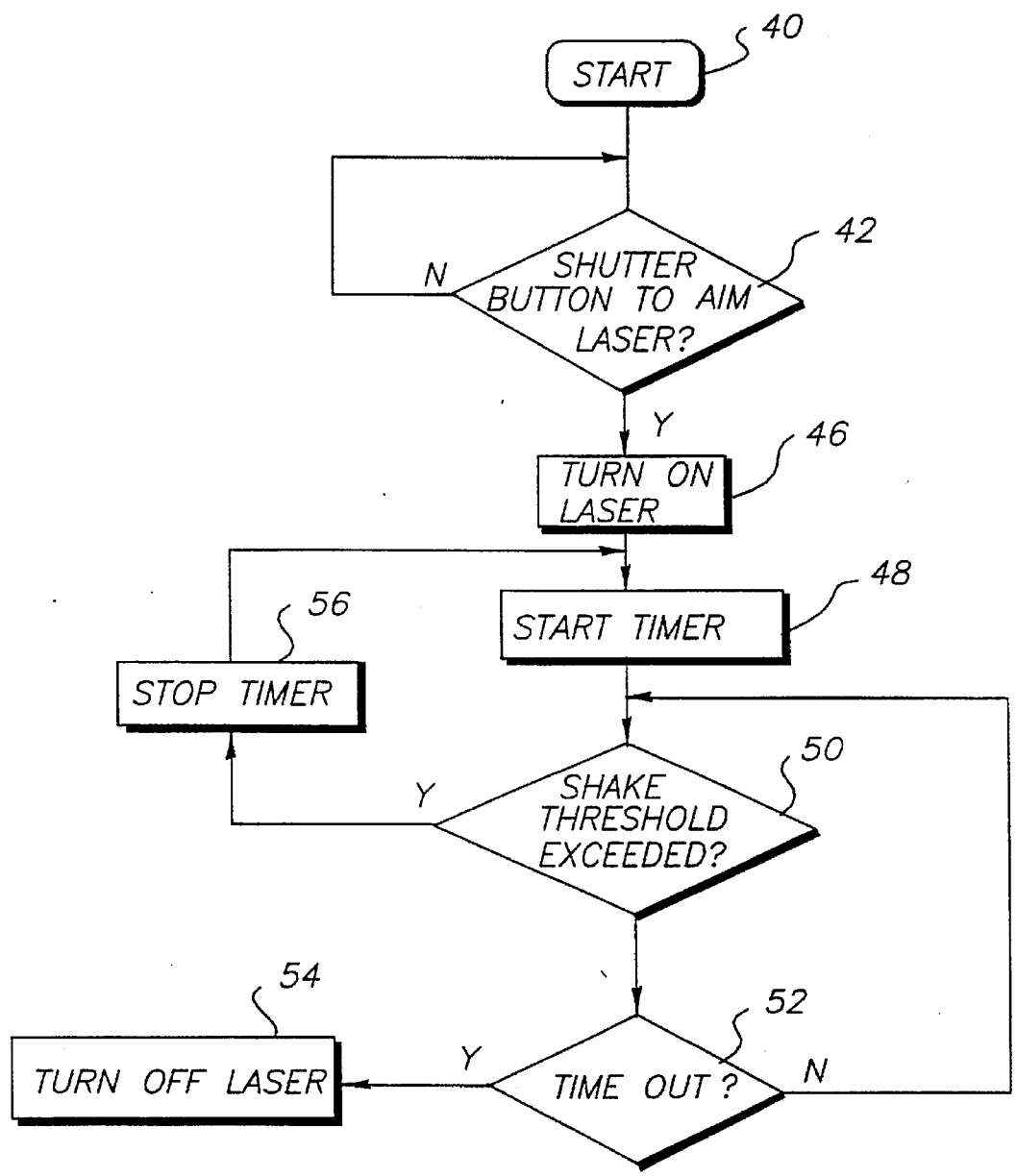
FIG. 3 is a flow chart of logic used by the camera of FIG. 1 in implementing the invention.

Referring to FIG. 3, a portion of the camera logic used by CPU 20 for controlling the operation of laser pointer 10 based on camera movement will be described. The CPU waits for the photographer to depress shutter button 18 to its first stage to aim the camera as shown around step 42. When the shutter button has been pressed to the first stage, the laser pointer is turned on at step 46 and timer 22 is initialized and started in step 48. CPU 20 then queries the shake (movement) detection circuitry 24 and compares the calculated shake frequency (movement) to a predetermined threshold frequency stored in the CPU's memory at step 50. If this threshold is met or exceeded, timer 22 is turned off at step 56 because the laser pointing aid 10 is moving too rapidly to impinge significant energy on the retina of a subject's eye. The logic then returns to step 48.

If the threshold is not exceeded, then the timer keeps running and CPU 20 queries timer 22 in step 52 to determine the length of possible exposure by the laser radiation. If the maximum time has elapsed for the laser to remain in the on position when not being moved, the laser pointer is turned off at step 54. If the maximum time has not elapsed at step 52, the logic returns to step 50. As such, the logic will allow the laser pointer to remain on as long as the camera is being moved at or above the predetermined magnitude because there is a low probability of damaging a person's eye with the laser radiation. Once the camera is being moved below the predetermined magnitude (i.e. being held relatively steady), the CPU shuts the laser pointer off after a predetermined time (e.g. 3 seconds) to prevent possible eye damage. Alternatively, the CPU can shut the laser off as soon as the camera is being moved below the predetermined magnitude.

Figure 4:
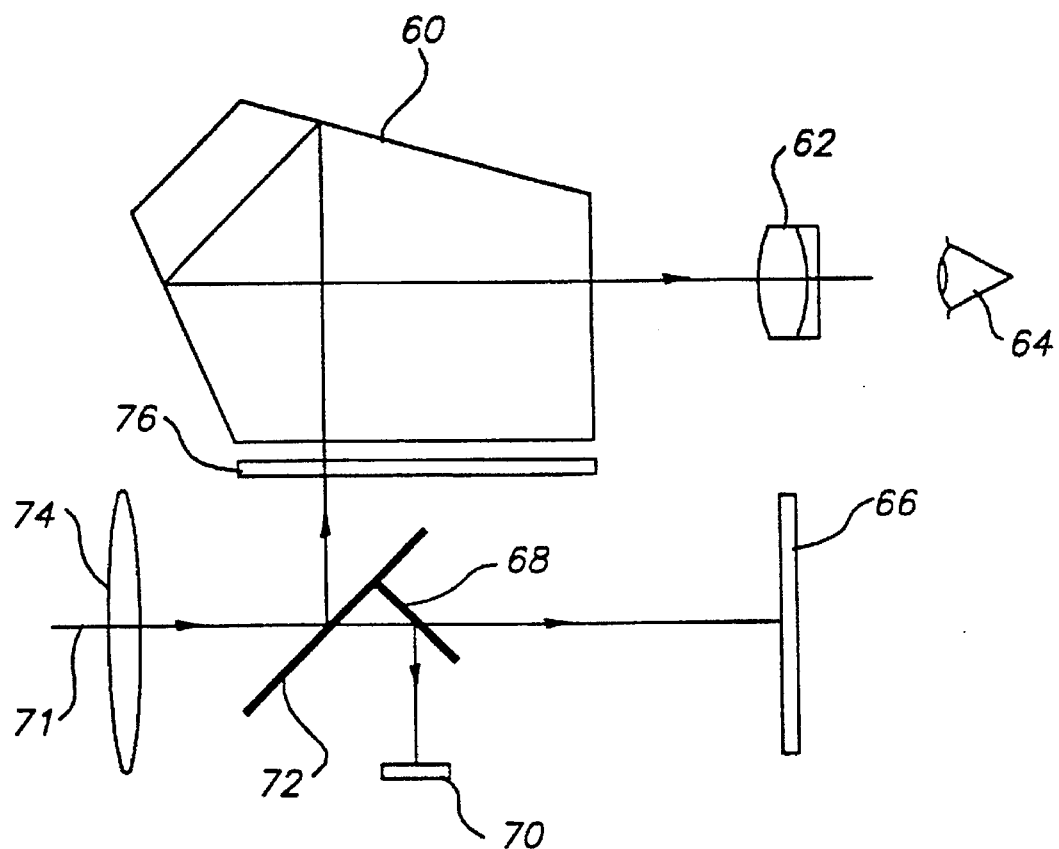
FIG. 4 is a schematic side view of a single lens reflex (SLR) camera incorporating an embodiment of the present invention.

Turning now to FIG. 4, there is disclosed a layout of optical components for through the lens (TTL) viewfinding and image capture paths typical of Single Lens Reflex (SLR) cameras. Image forming light 71 is processed by a taking lens 74 to focus an image on an image capture plane 66 during exposure, when a mirror 72 is rotated out of its position shown in FIG. 4, or an equivalent plane 76 which is viewable by a photographer's eye 64 through pentaprism 60 and viewfinder lens 62. Mirror 72 is actually a partial beam splitter in the central region of the mirror.

A mirror 68 takes the central portion of the light bundle, which is transmitted by mirror 72, and images it downward at yet another equivalent image plane where a light sensor assembly 70 is located. This arrangement is typical of TTL autofocus systems in SLR cameras. In prior art cameras, algorithms look at this central light image by sampling it frequently and determining if the image is moving substantially with respect to the chosen shutter speed to affect image blur which would result at the time of image capture. Some camera systems prevent exposure when the camera is not being held securely for a given focal length lens and shutter speed. Other cameras merely warn the user that the image may blur under the current image capture parameters. This decision in kind can also be used to affect the control of the laser pointing aid 10 as shown by the flow chart depicted in FIG. 3.

For those systems that use accelerometers or angular rate sensors mounted in the lens housing, the process and result of determining camera shake produces the same decision point 50 as shown in FIG. 3. The intent of the invention is to combine this decision point with the power control system for a laser used for autofocus (IR or visible) or a laser which is just used for aiming an image capture apparatus (visible). As such, maximum use of the laser for aiming the camera and/or autofocus can be obtained while minimizing possible damage to a human eye.

The invention has been described with reference to a preferred embodiment. However, it will be appreciated that variations and modifications can be effected by a person of ordinary skill in the art without departing from the scope of the invention.

PARTS LIST

1 Camera
2 Camera body
4 Flash assembly
6 Viewfinder window
8 Active AF emitter/detector
10 Visible laser pointing aid
12 Taking Lens
14 Exposure Cell
16 LCD Display
18 Shutter Button
20 Camera CPU
22 Timer Block
24 Shake Detection Circuitry
26 Laser Control Circuitry
28 Autofocus module
30 Lens Control module
32 Auto Exposure module
34 Flash module
40–56 Laser Control Logic Steps
60 Pentaprism
62 Viewfinder element
64 Photographer's eye
66 Film plane
68 Mirror
70 AF/Shake sensor
71 Image light
72 Beamsplitter Mirror
74 Principal Taking Lens
76 Ground glass viewing screen

We claim:

1. An image recording apparatus comprising a laser emitter which emits a beam of laser radiation towards a scene to be recorded, is characterized by:

a movement detector for detecting when the image recording apparatus is being moved at or above a predetermined magnitude such that blurred images may be recorded; and a controller which controls an output level of laser radiation from the laser emitter, the controller enabling the laser emitter to emit laser radiation when the movement detector detects movement of the image recording apparatus at or above the predetermined magnitude and disabling the laser emitter from emitting laser radiation when the movement detector detects movement of the image recording apparatus below the predetermined magnitude.

2. The image recording apparatus of claim 1, wherein the controller disables the laser emitter from emitting laser radiation a predetermined time after the movement detector detects movement of the image recording apparatus below the predetermined magnitude.

3. The image recording apparatus of claim 2, wherein the controller includes a timer for determining the predetermined time, the timer continuously restarting the count of the predetermined time while the movement detector detects movement of the image recording apparatus at or above the predetermined magnitude.

4. The image recording apparatus of claim 2, wherein the controller includes a timer for determining the predetermined time, the controller enabling the timer to determine the predetermined time while the movement detector detects movement of the image recording apparatus below the predetermined magnitude and the timer has not counted the predetermined time and disabling the timer from determining the predetermined time while the movement detector detects movement of the image recording apparatus at or above the predetermined magnitude and the timer has not counted the predetermined time.

5. The image recording apparatus of claim 1, wherein the laser radiation is visible to an unaided human eye and is utilized by an operator of the image recording apparatus to aim the image recording apparatus towards the scene.

6. The image recording apparatus of claim 5, further including imaging optics and an autofocus system for focusing the imaging optics, wherein the laser radiation is reflected back from the scene to the autofocus system which utilizes the reflected laser radiation in focusing the imaging optics.

7. The image recording apparatus of claim 1, further including imaging optics and an autofocus system for focusing the imaging optics, the laser radiation being nonvisible to an unaided human eye, wherein the laser radiation is reflected back from the scene to the autofocus system which utilizes the reflected laser radiation in focusing the imaging optics.

* * * * *